United States Patent
Fan et al.

(10) Patent No.: US 11,108,464 B2
(45) Date of Patent: Aug. 31, 2021

(54) APPARATUS AND METHOD FOR DETERMINING COEFFICIENTS OF FIXED EQUALIZER

(71) Applicant: Fujitsu Limited, Kawasaki (JP)

(72) Inventors: Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/030,637

(22) Filed: Sep. 24, 2020

(65) Prior Publication Data

US 2021/0126710 A1 Apr. 29, 2021

(30) Foreign Application Priority Data

Oct. 24, 2019 (CN) .......................... 201911016991.1

(51) Int. Cl.
 *H04B 10/2507* (2013.01)
 *H04B 10/61* (2013.01)
 *H04B 10/079* (2013.01)

(52) U.S. Cl.
 CPC ... *H04B 10/25073* (2013.01); *H04B 10/0795* (2013.01); *H04B 10/616* (2013.01)

(58) Field of Classification Search
 CPC ............ H04B 10/25073; H04B 10/616; H04B 10/0795; H04B 10/61; H04B 10/69; H03M 3/00; H04L 25/03
 (Continued)

(56) References Cited

U.S. PATENT DOCUMENTS 6,961,370 B2 * 11/2005 Chappell .................. H04B 3/46
  329/371
7,466,750 B2 * 12/2008 Kim ..................... H04B 7/0842
  375/232

(Continued)

FOREIGN PATENT DOCUMENTS

| CN | 103763226 | 4/2014 |
| CN | 105812060 | 7/2016 |
| CN | 108886407 | 11/2018 |

OTHER PUBLICATIONS

Chen Zhu et al., "Digital Signal Processing for Training-Aided Coherent Optical Single-Carrier Frequency-Domain Equalization Systems", Journal of Lightwave Technology, vol. 32, No. 24, Dec. 15, 2014, 11 pages.

(Continued)

*Primary Examiner* — Abbas H Alagheband
(74) *Attorney, Agent, or Firm* — Staas & Halsey LLP

(57) ABSTRACT

Embodiments of this disclosure provide an apparatus and method for determining coefficients of a fixed equalizer, the fixed equalizer being applicable to performing fixed equalization on an optical communications system, the apparatus including: a first acquiring unit configured to determine coefficients of an adaptive equalizer according to an output signal of the optical communications system; a first transforming unit configured to perform Fourier transform on at least a part of the coefficients of the adaptive equalizer to obtain frequency responses of the at least a part of the coefficients; and a first calculating unit configured to calculate coefficients of the fixed equalizer according to the frequency responses of the at least a part of the coefficients of the adaptive equalizer.

9 Claims, 4 Drawing Sheets

(58) Field of Classification Search
USPC .......................................................... 398/149
See application file for complete search history.

(56) References Cited

U.S. PATENT DOCUMENTS

| | | | | |
|---|---|---|---|---|
| 7,656,945 | B1* | 2/2010 | Warner | H04L 25/03038 375/233 |
| 7,773,700 | B2* | 8/2010 | Kang | H04L 25/03159 375/341 |
| 7,970,811 | B2* | 6/2011 | Shen | H03H 21/0001 708/819 |
| 8,385,747 | B2* | 2/2013 | Roberts | H04B 10/2572 398/150 |
| 8,923,460 | B1* | 12/2014 | Wang | H04B 10/6162 375/350 |
| 9,876,566 | B1* | 1/2018 | Fludger | H04B 10/40 |
| 10,038,573 | B2* | 7/2018 | Monsen | H04L 25/025 |
| 10,938,444 | B2* | 3/2021 | Kliger | H04B 3/23 |
| 2002/0168001 | A1* | 11/2002 | Ramsey | H04L 1/24 375/232 |
| 2003/0112861 | A1 | 6/2003 | Erdogan et al. | |
| 2004/0114912 | A1* | 6/2004 | Okamoto | G11B 20/10046 386/204 |
| 2004/0213339 | A1* | 10/2004 | Smee | H04L 25/0314 375/232 |
| 2014/0212132 | A1* | 7/2014 | Saito | H04L 25/03 398/25 |
| 2016/0308579 | A1* | 10/2016 | Abe | H04B 10/61 |
| 2017/0077945 | A1* | 3/2017 | Pagnanelli | H03M 3/50 |
| 2017/0264468 | A1* | 9/2017 | Millar | H04B 10/61 |
| 2017/0338895 | A1* | 11/2017 | Yasuda | H04L 25/03885 |
| 2017/0338978 | A1* | 11/2017 | Monsen | H04L 1/0045 |
| 2019/0123834 | A1 | 4/2019 | Zarubinsky et al. | |
| 2020/0052794 | A1* | 2/2020 | Noguchi | H04J 14/0224 |

OTHER PUBLICATIONS

Optical Internetworking Forum (OIF), "Implementation Agreement for a CFP2 Analogue Coherent Optics Module", IA OIF-CFP2-ACO-01.0, Physical and Link Layer (PLL) Working Group, 2016, 92 pages.
Cheng Ju et al., "Calibration of In-Phase/Quadrature Amplitude and Phase Response Imbalance for Coherent Receiver", OFC2017, W2A.55, 2017, 3 pages.
Yangyang Fan et al., "Overall Frequency Response Measurement of DSP-based Optical Transmitter Using Built-in Monitor Photodiode", ECOC2016 42nd European Conference and Exhibition on Optical Communications, Sep. 18-22, 2016, 3 pages.
Milen Paskov et al., "Blind Equalization of Receiver In-Phase/Quadrature Skew in the Presence of Nyquist Filtering", IEEE Photonics Technology Letters, vol. 25, No. 24, Dec. 15, 2013, 4 pages.
Rafeal Rios-Müller et al., "Blind Receiver Skew Compensation and Estimation for Long-Haul Non-Dispersion Managed Systems Using Adaptive Equalizer", Journal of Lightwave Technology, vol. 33, No. 7, Apr. 1, 2015, 4 pages.
Seb J. Savory, "Digital filters for coherent optical receivers", Optics Express, vol. 16, No. 2, 2008, 14 pages.
Yangyang Fan et al., "Transceiver IQ imperfection Monitor by Digital Signal Processing in Coherent Receiver", OECC/PSC 2019, ThC2-1 (Invited), 3 pages.

* cited by examiner

APPARATUS AND METHOD FOR DETERMINING COEFFICIENTS OF FIXED EQUALIZER

CROSS-REFERENCE TO RELATED APPLICATIONS

This application is based on and hereby claims priority to Chinese Application No. 201911016991.1, filed Oct. 24, 2019, in the State Intellectual Property Office of China, the disclosure of which is incorporated herein by reference.

TECHNICAL FIELD

This disclosure relates to the field of communications technologies.

BACKGROUND

Coherent optical communications systems occupy important positions in communications transmission networks for their advantages of huge transmission bandwidths and great expansion potentials, etc. In a coherent optical communications system, a transmission signal is simultaneously subjected to various signal impairments caused by an optical fiber transmission effect and a nonideal characteristic of an optical transceiver, etc. The coherent optical communications system compensates for these signal impairments by using a digital equalization technique.

A commonly used equalization scheme includes two parts: fixed equalizer (FEQ) and adaptive equalizer (AEQ). The fixed equalizer compensates for static impairments causing inter symbol interference (ISI) with long memory or short memory, such as frequency responses of each lanes and the relative delay, amplitude and phase imbalance between different lanes within an optical transceiver and channel chromatic dispersion. The adaptive equalizer usually deals with an dynamic impairments causing ISI with relative short memory length, such as fiber polarization mode dispersion (PMD).

The finite impulse response (FIR) filter coefficients of adaptive equalizers are adaptive, and conventional coefficient update algorithms include constant modulus algorithm (CMA), multi-modulus algorithm (MMA), and least mean square error algorithm (LMS), etc. As the FIR filter coefficients of the fixed equalizer cannot be updated by itself, there is a need to provide filter coefficients for the fixed equalizer. A common method for calculating coefficients is to first measure static impairments needing to be compensated one by one, and then calculate a joint response of them.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided an apparatus for determining coefficients of a fixed equalizer, the fixed equalizer being applicable to performing fixed equalization on an optical communications system, the apparatus including: a first acquiring unit configured to determine coefficients of an adaptive equalizer according to an output signal of the optical communications system; a first transforming unit configured to perform Fourier transform on at least a part of the coefficients of the adaptive equalizer to obtain frequency responses of the at least a part of the coefficients; and a first calculating unit configured to calculate coefficients of the fixed equalizer according to the frequency responses of the at least a part of the coefficients of the adaptive equalizer.

According to an embodiment of this disclosure, there is provided an electronic device, including the apparatus as described in the first aspect of the embodiments of this disclosure.

According to an embodiment of this disclosure, there is provided a method for determining coefficients of a fixed equalizer, the fixed equalizer being applicable to performing fixed equalization on an optical communications system, the method including: determining coefficients of an adaptive equalizer according to an output signal of the optical communications system; performing Fourier transform on at least a part of the coefficients of the adaptive equalizer to obtain frequency responses of the at least a part of the coefficients; and calculating coefficients of the fixed equalizer according to the frequency responses of the at least a part of the coefficients of the adaptive equalizer.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
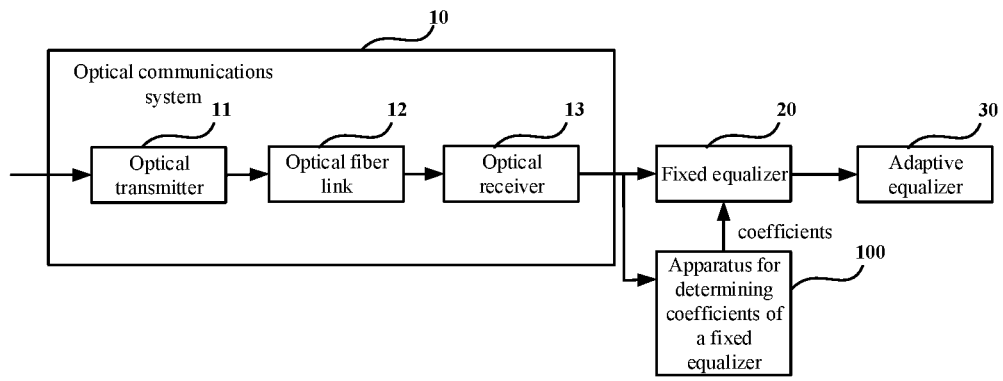
FIG. 1 is a schematic diagram of performing equalization processing on an optical communications system according to an embodiment of this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

It was found by the inventors that acquisition of responses of different fixed impairments may be in dependence on different measurement methods or monitoring methods, resulting in a relatively complicated method for calculating coefficients. Furthermore, some measurement methods or monitoring methods require additional devices or expensive instruments, resulting in relatively high costs.

Embodiments of this disclosure provide an apparatus and method for determining coefficients of a fixed equalizer, in which coefficients of a fixed equalizer are determined according to coefficients of an adaptive equalizer. The method of calculation is simple and needs no additional device; hence, the coefficients of the fixed equalizer may be quickly determined at a relatively low cost.

An advantage of the embodiments of this disclosure exists in that the coefficients of the fixed equalizer are determined according to the coefficients of the adaptive equalizer. The method of calculation is simple and needs no additional device; hence, the coefficients of the fixed equalizer may be quickly determined at a relatively low cost.

Embodiment 1

The embodiment of this disclosure provides an apparatus for determining coefficients of a fixed equalizer, which is disposed at an optical receiver end of an optical communications system.

FIG. 1 is a schematic diagram of performing equalization processing on an optical communications system of Embodiment 1 of this disclosure. As shown in FIG. 1, an optical communications system 10 includes an optical transmitter 11, an optical fiber link 12 and an optical receiver 13. A fixed equalizer 20 performs fixed equalization processing on a signal received by the optical receiver 13, and an adaptive equalizer 30 performs adaptive equalization processing on a fixed equalization compensated signal. An apparatus 100 for determining coefficients of a fixed equalizer determines coefficients of the fixed equalizer 20 according to an output signal of the optical communications system 10.

In this embodiment, the optical communications system 10 may also be a back-to-back system, that is, the optical communications system 10 may not include the optical fiber link 12, and is directly connected by the optical transmitter 11 and the optical receiver 13.

In this embodiment, the fixed equalizer 20 and the adaptive equalizer 30 may use various existing equalizer structures, and particular structures of the fixed equalizer 20 and the adaptive equalizer 30 are not limited in the embodiment of this disclosure.

Figure 2:
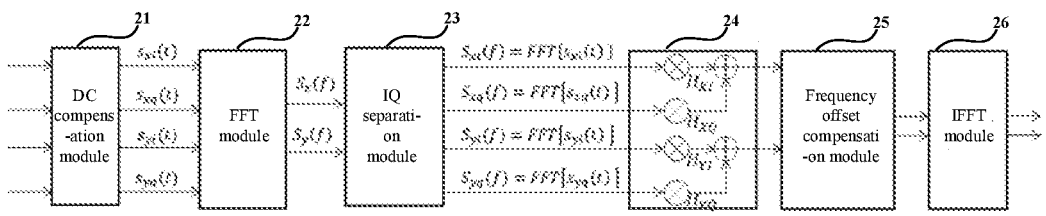
FIG. 2 is a schematic diagram of the fixed equalizer according to an embodiment of this disclosure.

FIG. 2 is a schematic diagram of the fixed equalizer 20 of Embodiment 1 of this disclosure. As shown in FIG. 2, the fixed equalizer includes a DC compensation module 21, an FFT module 22, an IQ separation module 23, a linear equalizer 24, a frequency offset compensation module 25 and an IFFT module 26. DC components in four paths of signals, XI, XQ, YI and YQ, received by the optical receiver, are removed after they pass through the DC compensation module 21, and total four paths of time domain real number signals, $s_{xi}(t)$, $s_{xq}(t)$, $s_{yi}(t)$, $s_{yq}(t)$, in an in-phase path (I path) and a quadrature path (Q path) in two polarization states, are outputted.

Then, the FFT module 22 performs fast Fourier transform (FFT) on complex signals $s_{xi}(t)+j*s_{xq}(t)$ and $s_{yi}(t)+j*s_{yq}(t)$ in the polarization states, so that the signals are transformed into the frequency domain, which may be expressed by formula (1) below:

$$S_x(f)=FFT[s_{xi}(t)+j*s_{xq}(t)]$$

$$S_y(f)=FFT[s_{yi}(t)+j*s_{yq}(t)] \quad (1);$$

where, $S_x(f)$ denotes a frequency domain signal in a polarization state x, $S_y(f)$ denotes a frequency domain signal in a polarization state y, and $s_{xi}(t)$, $s_{xq}(t)$, $s_{yi}(t)$, $s_{yq}(t)$ denote the four paths of time domain real number signals.

The IQ separation module 23 divides $S_x(f)$ and $S_y(f)$ into four paths of signals, and the four paths of signals outputted by it may be expressed by the formula (2) below:

$$S_{xi}(f)=FFT[s_{xi}(t)]$$

$$S_{xq}(f)=FFT[s_{xq}(t)]$$

$$S_{yi}(f)=FFT[s_{yi}(t)]$$

$$S_{yq}(f)=FFT[s_{yq}(t)] \quad (2);$$

where, $S_{xi}(f)$, $S_{xq}(f)$, $S_{yi}(f)$ and $S_{yq}(f)$ denote the divided four paths of signals, respectively.

In this embodiment, for example, the linear equalizer 24 achieves matched filtering, compensation of link dispersion, and compensation of a frequency response and IQ imbalance of an optical transceiver by using four frequency domain complex filters.

The frequency offset compensation module 25 roughly compensates for a frequency offset between lasers of the optical transceiver, and the signals are finally transformed back to the time domain by the IFFT module 26.

In this embodiment, the coefficients of a fixed equalizer refer to coefficients of the linear equalizer 24, such as coefficients $H_{XT}, H_{XQ}, H_{YT}, H_{YQ}$ shown in FIG. 2.

Figure 3:
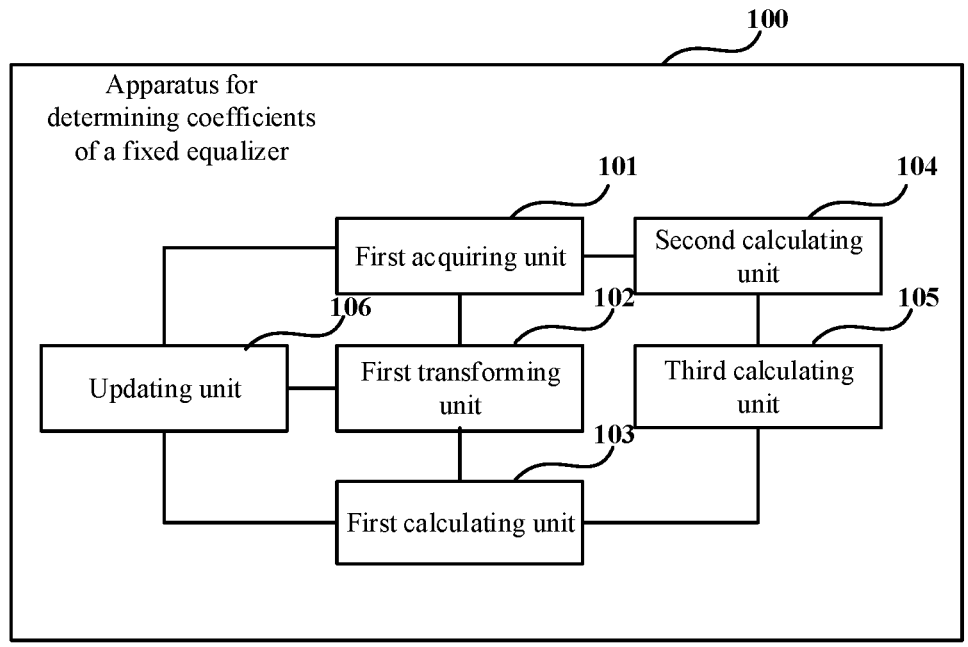
FIG. 3 is a schematic diagram of the apparatus for determining coefficients of a fixed equalizer according to an embodiment of this disclosure.

FIG. 3 is a schematic diagram of the apparatus for determining coefficients of a fixed equalizer of Embodiment 1 of this disclosure, the fixed equalizer being applicable to performing fixed equalization on an optical communications system, and the fixed equalizer being, for example, the fixed equalizer 20 shown in FIGS. 1 and 2.

As shown in FIG. 3, the apparatus 100 for determining coefficients of a fixed equalizer includes:

a first acquiring unit 101 configured to determine coefficients of an adaptive equalizer according to an output signal of the optical communications system;

a first transforming unit 102 configured to perform Fourier transform on at least a part of the coefficients of the adaptive equalizer to obtain frequency responses of the at least a part of the coefficients; and a first calculating unit 103 configured to calculate coefficients of the fixed equalizer according to the frequency responses of the at least a part of the coefficients of the adaptive equalizer.

In this way, as there exists a relatively large similarity between some performances of the adaptive equalizer and the fixed equalizer and the coefficients of the adaptive equalizer are relatively easy to be determined, the coefficients of the fixed equalizer are determined according to the coefficients of the adaptive equalizer. The method of calculation is simple and needs no additional device; hence, the coefficients of the fixed equalizer may be quickly determined at a relatively low cost.

In this embodiment, the adaptive equalizer used to determine the coefficients of the fixed equalizer may be different from an adaptive equalizer performing adaptive equalization processing on the optical communications system, such as being different from the adaptive equalizer 30 in FIG. 1. And an adaptive equalizer performing adaptive equalization on the optical communications system may be used, such as directly using the adaptive equalizer 30 in FIG. 1. That is, the adaptive equalizer used to determine the coefficients of the fixed equalizer and the adaptive equalizer used to perform dynamic equalization on the optical communications system may be the same adaptive equalizer, or may be two different adaptive equalizers.

In this embodiment, the first acquiring unit 101 determines the coefficient of the adaptive equalizer according to the output signal of the optical communications system.

Figure 4:
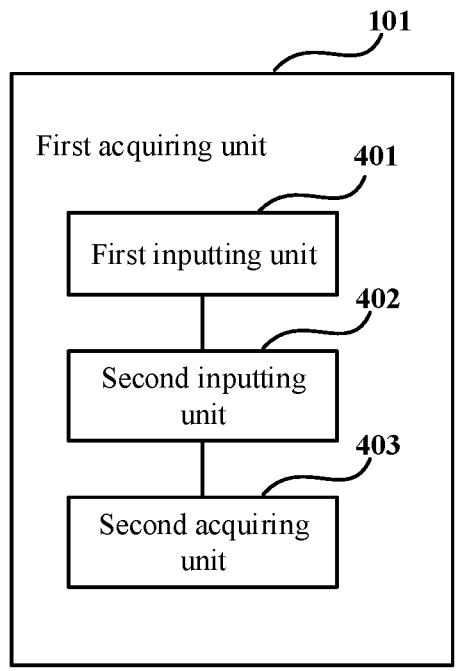
FIG. 4 is a schematic diagram of the first acquiring unit according to an embodiment of this disclosure.

FIG. 4 is a schematic diagram of the first acquiring unit 101 of Embodiment 1 of this disclosure. As shown in FIG. 4, the first acquiring unit 101 includes:

a first inputting unit 401 configured to input a test signal or a data signal into the optical communications system;

a second inputting unit 402 configured to input an output signal obtained after the test signal or the data signal passes through the optical communications system into the adaptive equalizer; and a second acquiring unit 403 configured to obtain the coefficients of the adaptive equalizer when the adaptive equalizer converges.

In this embodiment, the first inputting unit 401 inputs the test signal or the data signal into the optical communications system to obtain the output signal of the optical communications system, thereby determining the coefficients of the adaptive equalizer. That is, in this embodiment, the coefficients of the adaptive equalizer may be determined during a calibration stage before the optical communications system is used, and at this moment, the test signal is used; or the coefficients of the adaptive equalizer may be determined during a use stage of the optical communications system, and at this time, the data signal, i.e. an actually transmitted signal, is used.

In this embodiment, the adaptive equalizer used to determine the coefficients of the fixed equalizer may be various types of adaptive equalizers, such as a 4×4 MIMO (multiple input multiple output) adaptive equalizer used for a back-to-back system with no fiber link, or a 2×4 MIMO adaptive equalizer used for an optical communications system with an optical fiber link, the 2×4 MIMO adaptive equalizer being also able to be referred to as a 4×2 MIMO adaptive equalizer.

In this embodiment, description shall be given by taking a 4×4 MIMO adaptive equalizer and a 2×4 MIMO adaptive equalizer as examples.

The first transforming unit 102 performs Fourier transform on at least a part of the coefficients of the adaptive equalizer to obtain frequency responses of the at least a part of the coefficients.

Figure 5:
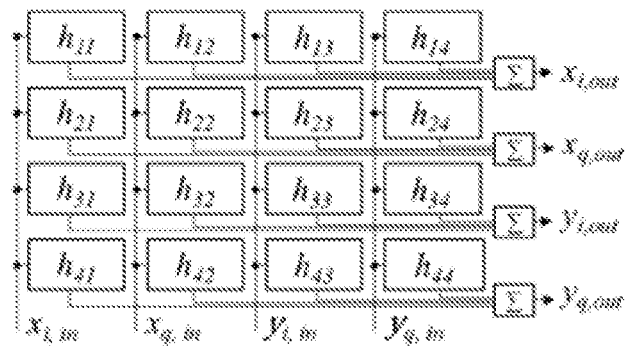
FIG. 5 is a schematic diagram of a 4×4 MIMO adaptive equalizer according to an embodiment of this disclosure.
Figure 6:
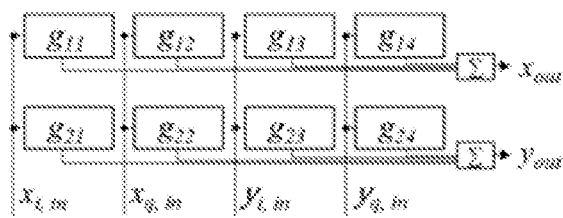
FIG. 6 is a schematic diagram of a 2×4 MIMO adaptive equalizer according to an embodiment of this disclosure.

FIG. 5 is a schematic diagram of the 4×4 MIMO adaptive equalizer of Embodiment 1 of this disclosure, and FIG. 6 is a schematic diagram of the 2×4 MIMO adaptive equalizer of Embodiment 1 of this disclosure. As shown in FIG. 5, the 4×4 MIMO adaptive equalizer has 4×4 coefficients, and the 2×4 MIMO adaptive equalizer has 2×4 coefficients.

For the 4×4 MIMO adaptive equalizer, its 4×4 coefficients need to be transformed to obtain 2×4 coefficients, such as transforming 4×4 coefficients to obtain 2×4 coefficients according to formula (3) below:

$$g_{1n}=h_{1n}+Jh_{2n}, (n=1,2,3,4)$$

$$g_{2n}=h_{3n}+Jh_{4n}, (n=1,2,3,4) \qquad (3);$$

where, $h_{1n}, h_{2n}, h_{3n}$ and $h_{4n}$ are 4×4 coefficients of the 4×4 MIMO adaptive equalizer, and $g_{1n}$ and $g_{2n}$ are 2×4 coefficients obtained after transformed.

In this embodiment, the first transforming unit 102 performs Fourier transform according to four main diagonal coefficients and four secondary diagonal coefficients in 2×4 coefficients obtained by transforming 4×4 coefficients of the 4×4 MIMO adaptive equalizer or 2×4 coefficients of the 2×4 MIMO adaptive equalizer to obtain four main diagonal frequency domain coefficients and four secondary diagonal frequency domain coefficients.

In this embodiment, a length of the Fourier transform is generally greater than the number of taps of the MIMO adaptive equalizer, it is needed to add zeros to ends of sub-filter time domain coefficients so that their lengths are equal to the length of the Fourier transform, and then the Fourier transform is performed.

In this embodiment, the four main diagonal coefficients are $g_{11}, g_{12}, g_{23}$ and $g_{24}$, respectively, the four secondary diagonal coefficients are $g_{13}, g_{14}, g_{21}$ and $g_{22}$, respectively, and these coefficients may also be referred to as sub-filters. The four main diagonal frequency domain coefficients obtained by performing Fourier transform on the four main diagonal coefficients and the four secondary diagonal coefficients may be expressed as $G_{11}, G_{12}, G_{23}$ and $G_{24}$, and the four secondary diagonal frequency domain coefficients may be expressed as $G_{13}, G_{14}, G_{21}$ and $G_{22}$.

The first calculating unit 103 calculates the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients.

And furthermore, when the input signal of the fixed equalizer includes a chromatic dispersion impairment, the first calculating unit 103 calculates the coefficients of the fixed equalizer according to a frequency response of a chromatic dispersion equalizer.

For example, the coefficients of the fixed equalizer are calculated according to formula (4) below:

$$H_{XI} = (k_1 G_{11} + k_2 G_{21}) H_{CDC}$$

$$H_{XQ} = (k_1 G_{12} + k_2 G_{22}) H_{CDC}$$

$$H_{YI} = (k_1 G_{23} + k_2 G_{13}) H_{CDC}$$

$$H_{YQ} = (k_1 G_{24} + k_2 G_{14}) H_{CDC} \quad (4);$$

where, $H_{XI}$, $H_{XQ}$, $H_{YI}$ $H_{YQ}$ respectively denote the four coefficients of the fixed equalizer, $G_{11}$, $G_{12}$, $G_{23}$ and $G_{24}$ denote the four main diagonal frequency domain coefficients, $G_{13}$, $G_{14}$, $G_{21}$ and $G_{22}$ denote the four secondary diagonal frequency domain coefficients, $k_1$ denotes the first weight, $k_2$ denotes the second weight, and $H_{CDC}$ denotes the frequency response of the chromatic dispersion equalizer.

In this embodiment, the frequency response of the chromatic dispersion equalizer may be calculated by using an existing method. For example, the frequency response of the chromatic dispersion equalizer may be calculated according to formula (5) below:

$$H_{CDC} = \exp\left(\frac{j}{2}\beta_2 \omega^2 z\right); \quad (5)$$

where, $H_{CDC}$ denotes the frequency response of the chromatic dispersion equalizer, $\beta_2$ is a group velocity dispersion coefficient, z is a transmission distance, and ω is an angular frequency relative to an optical carrier. And furthermore, when higher-order dispersion needs to be compensated, a higher-order dispersion coefficient needs to be taken into account in $H_{CDC}$.

In this embodiment, the first weight and the second weight may be determined in various methods. For example, they may be determined according to a first coefficient cumulative value on a main diagonal and a second coefficient cumulative value on a secondary diagonal.

In this embodiment, the apparatus 100 may further include:

a second calculating unit 104 configured to calculate a first coefficient cumulative value on a main diagonal according to the four main diagonal coefficients, and calculate a second coefficient cumulative value on a secondary diagonal according to the four secondary diagonal coefficients; and a third calculating unit 105 configured to calculate the first weight and the second weight according to the first coefficient cumulative value and the second coefficient cumulative value.

For example, the first weight and the second weight may be obtained through calculation according to formula (6) below:

$$k_1 = \sqrt{\frac{W_1^2}{W_1^2 + W_2^2}}, k_2 = \sqrt{\frac{W_2^2}{W_1^2 + W_2^2}}; \quad (6)$$

where, $k_1$ denotes the first weight, $k_2$ denotes the second weight, $W_1$ denotes the first coefficient cumulative value on the main diagonal, and $W_2$ denotes the second coefficient cumulative value on the secondary diagonal.

For example, first coefficient cumulative value and the second coefficient cumulative value may be calculated by using formula (7) below:

$$W_1 = \Sigma hd\ n=1^N |g_{11}(n)|^2 + |g_{12}(n)|^2 + |g_{23}(n)|^2 + |g_{24}(n)|^2$$

$$W_2 = \Sigma_{n=1}^N |g_{21}(n)|^2 + |g_{22}(n)|^2 + |g_{13}(n)|^2 + |g_{14}(n)|^2 \quad (7);$$

where, $W_1$ denotes the first coefficient cumulative value on the main diagonal, $W_2$ denotes the second coefficient cumulative value on the secondary diagonal, and N denotes the number of taps of a sub-filter $g_{mn}$, m=1,2, n=1,2,3,4.

For another example, when the first coefficient cumulative value $W_1$ is greater than or equal to the second coefficient cumulative value $W_2$, the third calculating unit 105 sets the first weight $k_1$ to be 1, and sets the second weight $k_2$ to be 0; and when the first coefficient cumulative value $W_1$ is less than the second coefficient cumulative value $W_2$, the third calculating unit 105 sets the first weight $k_1$ to be 0, and sets the second weight $k_2$ to be 1.

In this embodiment, the apparatus 100 may further include:

an updating unit 106 configured to, in a process of use of the optical communications system, re-obtain coefficients of the adaptive equalizer according to an output signal of the optical communications system, recalculate coefficients of the fixed equalizer according to the re-obtained coefficients of the adaptive equalizer, and update the coefficients of the fixed equalizer according to the recalculated coefficients of the fixed equalizer.

In this embodiment, a method for recalculating the coefficients of the fixed equalizer is identical to the method described above, that is, recalculating the coefficients of the fixed equalizer by using the first acquiring unit 101, the first transforming unit 102 and the first calculating unit 103, which shall not be described herein any further.

In this way, in a process of use of the optical communications system, the coefficients of the fixed equalizer are updated according to the output signal of the optical communications system, thereby avoiding influence of such factors as device aging, and environmental changes, etc., on the performance of the fixed equalization, and ensuring accuracy and efficiency of the coefficients of the fixed equalization.

It can be seen from the above embodiment that the coefficients of the fixed equalizer are determined according to the coefficients of the adaptive equalizer. The method of calculation is simple and needs no additional device; hence, the coefficients of the fixed equalizer may be quickly determined at a relatively low cost.

Embodiment 2

Figure 7:
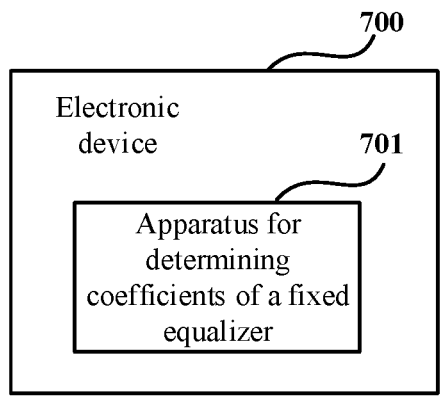
FIG. 7 is a schematic diagram of the electronic device according to an embodiment of this disclosure.

The embodiment of this disclosure provides an electronic device. FIG. 7 is a schematic diagram of the electronic device of Embodiment 2 of this disclosure. As shown in FIG. 7, an electronic device 700 includes an apparatus 701 for determining coefficients of a fixed equalizer, a structure and function of the apparatus for determining coefficients of a fixed equalizer being identical to those described in Embodiment 1, and being not going to be described herein any further.

Figure 8:
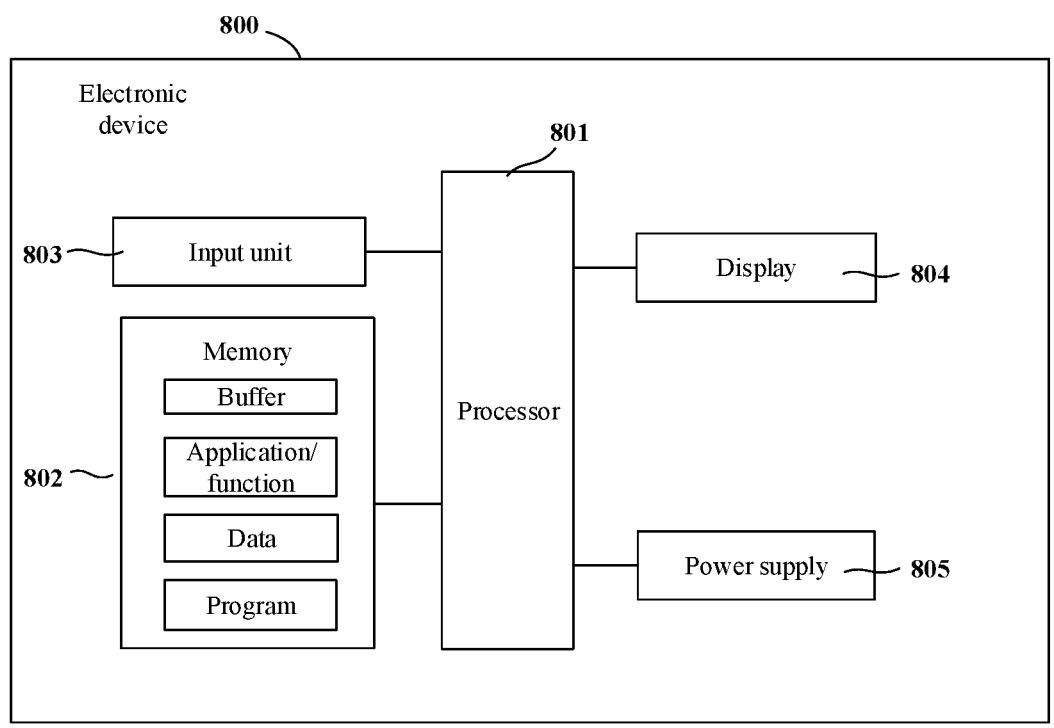
FIG. 8 is a block diagram of a systematic structure of the electronic device according to an embodiment of this disclosure.

FIG. 8 is a block diagram of a systematic structure of the electronic device of Embodiment 2 of this disclosure. As shown in FIG. 8, an electronic device 800 may include a processor 801 and a memory 802, the memory 802 being coupled to the processor 801. This figure is illustrative only, and other types of structures may also be used, so as to supplement or replace this structure and achieve a telecommunications function or other functions.

As shown in FIG. 8, the electronic device 800 may further include an input unit 803, a display 804 and a power supply 805.

In one implementation, the function of the apparatus for determining coefficients of a fixed equalizer described in Embodiment 1 may be integrated into the processor 801. For example, the processor 801 may be configured to: determine coefficients of an adaptive equalizer according to an output signal of the optical communications system; perform Fourier transform on at least a part of the coefficients of the adaptive equalizer to obtain frequency responses of the at least a part of the coefficients; and calculate coefficients of the fixed equalizer according to the frequency responses of the at least a part of the coefficients of the adaptive equalizer.

For example, the determining coefficients of an adaptive equalizer according to an output signal of the optical communications system includes: inputting a test signal or a data signal into the optical communications system; inputting an output signal obtained after the test signal or the data signal passes through the optical communications system into the adaptive equalizer; and obtaining the coefficients of the adaptive equalizer when the adaptive equalizer converges.

For example, the adaptive equalizer is a 4×4 MIMO adaptive equalizer or a 2×4 MIMO adaptive equalizer, and the performing Fourier transform on at least a part of the coefficients of the adaptive equalizer to obtain frequency responses of the at least a part of the coefficients, and calculating coefficients of the fixed equalizer according to the frequency responses of the at least a part of the coefficients of the adaptive equalizer, include: calculating the coefficients of the fixed equalizer according to four main diagonal coefficients and four secondary diagonal coefficients in 2×4 coefficients obtained by transforming 4×4 coefficients of the 4×4 MIMO adaptive equalizer or 2×4 coefficients of the 2×4 MIMO adaptive equalizer to obtain four main diagonal frequency domain coefficients and four secondary diagonal frequency domain coefficients; and calculating the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients.

For example, the calculating the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients includes: calculating the coefficients of the fixed equalizer according to the four main diagonal frequency domain coefficients, the first weight of the main diagonal frequency domain coefficients, the four secondary diagonal frequency domain coefficients, the second weight of the secondary diagonal frequency domain coefficients and a frequency response of a chromatic dispersion equalizer.

For example, a first coefficient cumulative value on a main diagonal is calculated according to the four main diagonal coefficients, and a second coefficient cumulative value on a secondary diagonal is calculated according to the four secondary diagonal coefficients, and the first weight and the second weight are calculated according to the first coefficient cumulative value and the second coefficient cumulative value.

For example, the calculating the first weight and the second weight according to the first coefficient cumulative value and the second coefficient cumulative value includes: when the first coefficient cumulative value is greater than or equal to the second coefficient cumulative value, setting the first weight to be 1, and setting the second weight to be 0; and when the first coefficient cumulative value is less than the second coefficient cumulative value, setting the first weight to be 0, and setting the second weight to be 1.

For example, in a process of use of the optical communications system, the coefficients of the adaptive equalizer are re-obtained according to an output signal of the optical communications system, coefficients of the fixed equalizer are recalculated according to the re-obtained coefficients of the adaptive equalizer, and the coefficients of the fixed equalizer are updated according to the recalculated coefficients of the fixed equalizer.

In another embodiment, the apparatus for determining coefficients of a fixed equalizer described in Embodiment 1 and the processor 801 may be configured separately; for example, the apparatus for determining coefficients of a fixed equalizer may be configured as a chip connected to the processor 801, and the functions of the apparatus for determining coefficients of a fixed equalizer are executed under the control of the processor 801.

In this embodiment, the electronic device does not necessarily include all the components shown in FIG. 8.

As shown in FIG. 8, the processor 801 is sometimes referred to as a controller or an operational control, which may include a microprocessor or other processor devices and/or logic devices, and may receive input and control operations of the components of the electronic device 800.

The memory 802 may be, for example, one or more of a buffer, a flash memory, a hard drive, a removable medium, a volatile memory, a non-volatile memory, or other suitable devices. And the processor 801 may execute a program stored in the memory 802 to achieve information storage or processing. Functions of other components are similar to those of existing ones, and shall not be described herein any further. Component of the electronic device 800 may be implemented by dedicated hardware, firmware, software or a combination thereof, without departing from the scope of this disclosure.

In this embodiment, the electronic device 800 may be a stand-alone device, such as a stand-alone computer, or the electronic device 800 may be integrated in an optical receiver.

It can be seen from the above embodiment that the coefficients of the fixed equalizer are determined according to the coefficients of the adaptive equalizer. The method of calculation is simple and needs no additional device; hence, the coefficients of the fixed equalizer may be quickly determined at a relatively low cost.

Embodiment 3

The embodiment of this disclosure provides a method for determining coefficients of a fixed equalizer, corresponding to the apparatus for determining coefficients of a fixed equalizer described in Embodiment 1.

Figure 9:
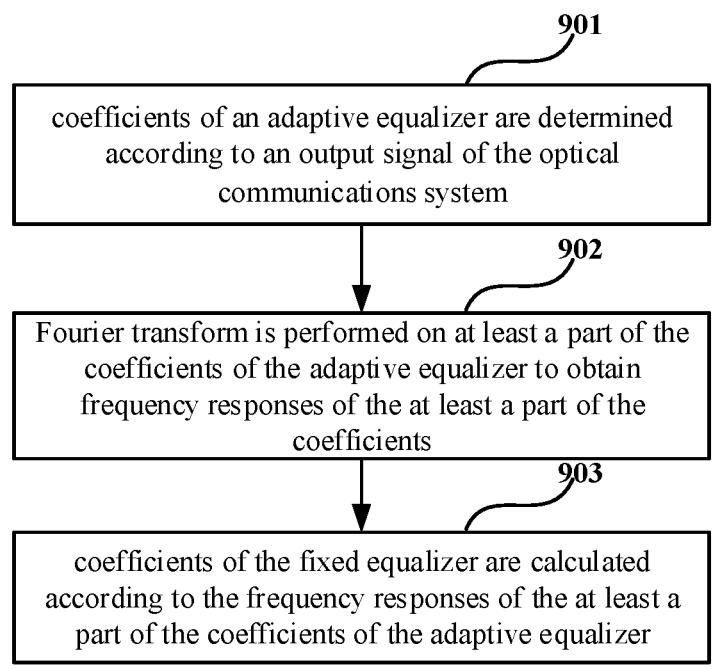
FIG. 9 is a schematic diagram of the method for determining coefficients of a fixed equalizer according to an embodiment of this disclosure.

FIG. 9 is a schematic diagram of the method for determining coefficients of a fixed equalizer of Embodiment 3 of this disclosure. The fixed equalizer is used to perform fixed equalization on an optical communications system. As shown in FIG. 9, the method includes:

Operation 901: coefficients of an adaptive equalizer are determined according to an output signal of the optical communications system;

Operation 902: Fourier transform is performed on at least a part of the coefficients of the adaptive equalizer to obtain frequency responses of the at least a part of the coefficients; and Operation 903: coefficients of the fixed equalizer are calculated according to the frequency responses of the at least a part of the coefficients of the adaptive equalizer.

In this embodiment, reference may be made to implementations of the functions of the components in Embodiment 1 for execution of the above operations, which shall not be described herein any further.

It can be seen from the above embodiment that the coefficients of the fixed equalizer are determined according to the coefficients of the adaptive equalizer. The method of calculation is simple and needs no additional device; hence, the coefficients of the fixed equalizer may be quickly determined at a relatively low cost.

An embodiment of this disclosure provides a computer readable program, which, when executed in an apparatus for determining coefficients of a fixed equalizer or an electronic device, will cause a computer to carry out the method for determining coefficients of a fixed equalizer as described in Embodiment 3 in the apparatus for determining coefficients of a fixed equalizer or the electronic device.

An embodiment of this disclosure provides a computer storage medium, including a computer readable program, which will cause a computer to carry out the method for determining coefficients of a fixed equalizer as described in Embodiment 3 in an apparatus for determining coefficients of a fixed equalizer or an electronic device.

The above method for determining coefficients of a fixed equalizer carried out in the apparatus for determining coefficients of a fixed equalizer or the electronic device described with reference to the embodiments of this disclosure may be directly embodied as hardware, software modules executed by a processor, or a combination thereof. For example, one or more functional block diagrams and/or one or more combinations of the functional block diagrams shown in FIG. 3 may either correspond to software modules of procedures of a computer program, or correspond to hardware modules. Such software modules may respectively correspond to the operations shown in FIG. 9. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 3 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 3 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

According to various implementations disclosed in the embodiments of this disclosure, following supplements are further disclosed.

1. A method for determining coefficients of a fixed equalizer, the fixed equalizer being applicable to performing fixed equalization on an optical communications system, the method including:

determining coefficients of an adaptive equalizer according to an output signal of the optical communications system;

performing Fourier transform on at least a part of the coefficients of the adaptive equalizer to obtain frequency responses of the at least a part of the coefficients; and calculating coefficients of the fixed equalizer according to the frequency responses of the at least a part of the coefficients of the adaptive equalizer.

2. The method according to supplement 1, wherein the determining coefficients of an adaptive equalizer according to an output signal of the optical communications system includes:

inputting a test signal or a data signal into the optical communications system;

inputting an output signal obtained after the test signal or the data signal passes through the optical communications system into the adaptive equalizer; and obtaining the coefficients of the adaptive equalizer when the adaptive equalizer converges.

3. The method according to supplement 1, wherein, the adaptive equalizer is a 4×4 MIMO adaptive equalizer or a 2×4 MIMO adaptive equalizer, and the performing Fourier transform on at least a part of the coefficients of the adaptive equalizer to obtain frequency responses of the at least a part of the coefficients, and calculating coefficients of the fixed equalizer according to the frequency responses of the at least a part of the coefficients of the adaptive equalizer, include:

calculating the coefficients of the fixed equalizer according to four main diagonal coefficients and four secondary diagonal coefficients in 2×4 coefficients obtained by transforming 4×4 coefficients of the 4×4 MIMO adaptive equalizer or 2×4 coefficients of the 2×4 MIMO adaptive equalizer to obtain four main diagonal frequency domain coefficients and four secondary diagonal frequency domain coefficients; and calculating the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients.

4. The method according to supplement 3, wherein the calculating the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients includes:

calculating the coefficients of the fixed equalizer according to the four main diagonal frequency domain coefficients, the first weight of the main diagonal frequency domain coefficients, the four secondary diagonal frequency domain coefficients, the second weight of the secondary diagonal frequency domain coefficients and a frequency response of a chromatic dispersion equalizer.

5. The method according to supplement 3, wherein the method further includes:

calculating a first coefficient cumulative value on a main diagonal according to the four main diagonal coefficients, and calculating a second coefficient cumulative value on a secondary diagonal according to the four secondary diagonal coefficients; and calculating the first weight and the second weight according to the first coefficient cumulative value and the second coefficient cumulative value.

6. The method according to supplement 5, wherein the calculating the first weight and the second weight according to the first coefficient cumulative value and the second coefficient cumulative value includes:

when the first coefficient cumulative value is greater than or equal to the second coefficient cumulative value, setting the first weight to be 1, and setting the second weight to be 0; and when the first coefficient cumulative value is less than the second coefficient cumulative value, setting the first weight to be 0, and setting the second weight to be 1.

7. The method according to supplement 1, wherein the method further includes: in a process of use of the optical communications system, re-obtaining coefficients of the adaptive equalizer according to an output signal of the optical communications system, and recalculating coefficients of the fixed equalizer according to the re-obtained coefficients of the adaptive equalizer; and updating the coefficients of the fixed equalizer according to the recalculated coefficients of the fixed equalizer.

What is claimed is:

1. An apparatus for determining coefficients of a fixed equalizer, the fixed equalizer being applicable to performing fixed equalization on an optical communications system, the apparatus comprising:
a memory that stores a plurality of instructions; and
a processor coupled to the memory and configured to:
determine coefficients of an adaptive equalizer according to an output signal of the optical communications system:
perform Fourier transform on at least a part of the coefficients of the adaptive equalizer to obtain frequency responses of the at least the part of the coefficients; and
calculate coefficients of the fixed equalizer according to the frequency responses of the at least the part of the coefficients of the adaptive equalizer;

wherein, the adaptive equalizer is a 4×4 Multiple Input Multiple Output (MIMO) adaptive equalizer or a 2×4 MIMO adaptive equalizer, the processor performs Fourier transform according to four main diagonal coefficients and four secondary diagonal coefficients in 2×4 coefficients obtained by transforming 4×4 coefficients of the 4×4 MIMO adaptive equalizer or 2×4 coefficients of the 2×4 MIMO adaptive equalizer to obtain four main diagonal frequency domain coefficients and four secondary diagonal frequency domain coefficients, and the processor calculates the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients.

2. The apparatus according to claim 1, wherein the coefficients of the adaptive equalizer are determined based on:

inputting of a test signal or a data signal into the optical communications system;

inputting of an output signal obtained after the test signal or the data signal passes through the optical communications system into the adaptive equalizer;

wherein the coefficients of the adaptive equalizer are obtained when the adaptive equalizer converges.

3. The apparatus according to claim 1, wherein, the processor calculates the coefficients of the fixed equalizer according to the four main diagonal frequency domain coefficients, the first weight of the main diagonal frequency domain coefficients, the four secondary diagonal frequency domain coefficients, the second weight of the secondary diagonal frequency domain coefficients and a frequency response of a chromatic dispersion equalizer.

4. The apparatus according to claim 1, wherein the processor is configured to:

calculate a first coefficient cumulative value on a main diagonal according to the four main diagonal coefficients, and calculate a second coefficient cumulative value on a secondary diagonal according to the four secondary diagonal coefficients; and calculate the first weight of the main diagonal frequency domain coefficients and the second weight of the secondary diagonal frequency domain coefficients according to the first coefficient cumulative value and the second coefficient cumulative value.

5. The apparatus according to claim 4, wherein, when the first coefficient cumulative value is greater than or equal to the second coefficient cumulative value, the first weight of the main diagonal frequency domain coefficients is set to be 1, and the second weight of the secondary diagonal frequency domain coefficients is set to be 0; and when the first coefficient cumulative value is less than the second coefficient cumulative value, the first weight of the main diagonal frequency domain coefficients is set to be 0, and sets the second weight of the secondary diagonal frequency domain coefficients is set to be 1.

6. An electronic device, comprising the apparatus as claimed in claim 1.

7. An apparatus for determining coefficients of a fixed equalizer, the fixed equalizer being applicable to performing fixed equalization on an optical communications system, the apparatus comprising:
a memory that stores a plurality of instructions; and a processor coupled to the memory and configured to:
  determine coefficients of an adaptive equalizer according to an output signal of the optical communications system:
    perform Fourier transform on at least a part of the coefficients of the adaptive equalizer to obtain frequency responses of the at least the part of the coefficients:
    calculate coefficients of the fixed equalizer according to the frequency responses of the at least the part of the coefficients of the adaptive equalizer; and
    re-obtain, coefficients of the adaptive equalizer according to an output signal of the optical communications system, recalculate coefficients of the fixed equalizer according to the re-obtained coefficients of the adaptive equalizer, and update the coefficients of the fixed equalizer according to the recalculated coefficients of the fixed equalizer while the optical communications system is in use.

8. A method for determining coefficients of a fixed equalizer, the fixed equalizer being applicable to performing fixed equalization on an optical communications system, the method comprising:
  determining coefficients of an adaptive equalizer according to an output signal of the optical communications system:
  performing Fourier transform on at least a part of the coefficients of the adaptive equalizer to obtain frequency responses of the at least the part of the coefficients; and
  calculating coefficients of the fixed equalizer according to the frequency responses of the at least the part of the coefficients of the adaptive equalizer:
  wherein, the adaptive equalizer is a 4×4 Multiple Input Multiple Output (MIMO) adaptive equalizer or a 2×4 MIMO adaptive equalizer, and
  the performing Fourier transform on the at least the part of the coefficients of the adaptive equalizer to obtain frequency responses of the at least the part of the coefficients and calculating coefficients of the fixed equalizer according to the frequency responses of the at least the part of the coefficients of the adaptive equalizer comprise:
    performing Fourier transform according to four main diagonal coefficients and four secondary diagonal coefficients in 2×4 coefficients obtained by transforming 4×4 coefficients of the 4×4 MI MO adaptive equalizer or 2×4 coefficients of the 2×4 MI MO adaptive equalizer to obtain four main diagonal frequency domain coefficients and four secondary diagonal frequency domain coefficients; and
    calculating the coefficients of the fixed equalizer according to the four main diagonal frequency domain coefficients, a first weight of the main diagonal frequency domain coefficients, the four secondary diagonal frequency domain coefficients and a second weight of the secondary diagonal frequency domain coefficients.

9. A method for determining coefficients of a fixed equalizer, the fixed equalizer being applicable to performing fixed equalization on an optical communications system, the method comprising:
  determining coefficients of an adaptive equalizer according to an output signal of the optical communications system;
  performing Fourier transform on at least a part of the coefficients of the adaptive equalizer to obtain frequency responses of the at least the part of the coefficients;
  calculating coefficients of the fixed equalizer according to the frequency responses of the at least the part of the coefficients of the adaptive equalizer; and
  re-obtaining, coefficients of the adaptive equalizer according to an output signal of the optical communications system, recalculating coefficients of the fixed equalizer according to the re-obtained coefficients of the adaptive equalizer, and updating the coefficients of the fixed equalizer according to the recalculated coefficients of the fixed equalizer while the optical communications system is in use.

* * * * *